A. G. TOMKIES.
BELT FASTENER.
APPLICATION FILED NOV. 7, 1907.
900,615.
Patented Oct. 6, 1908.
2 SHEETS—SHEET 2.
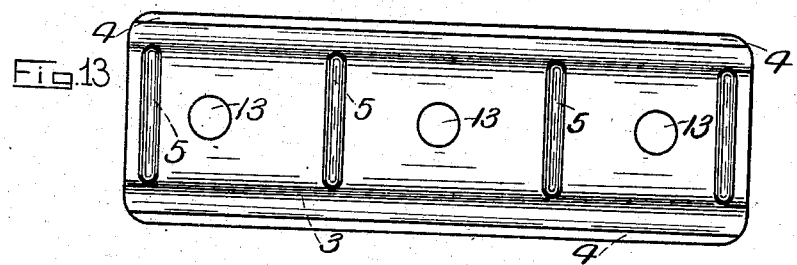
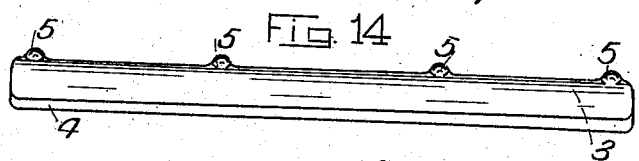
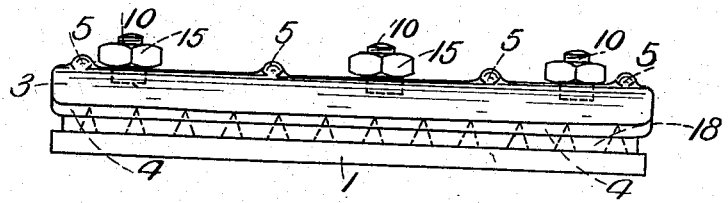
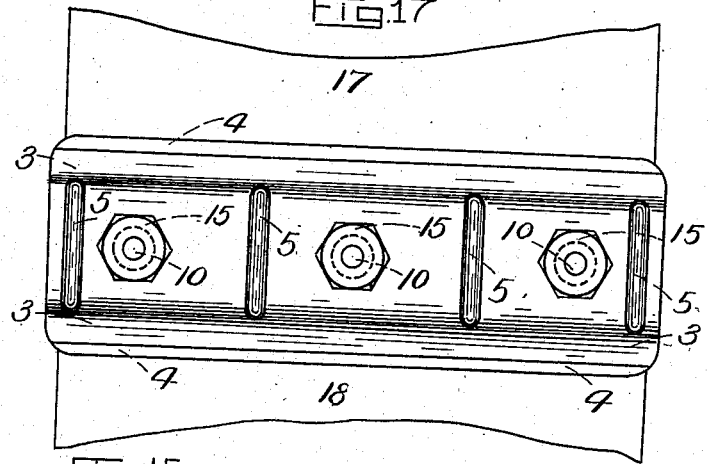
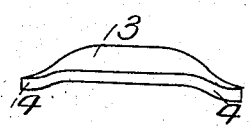
WITNESSES
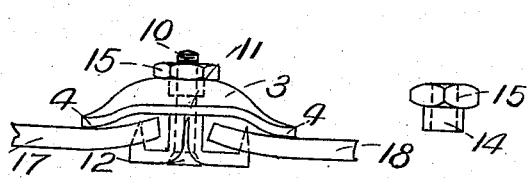
INVENTOR

UNITED STATES PATENT OFFICE.

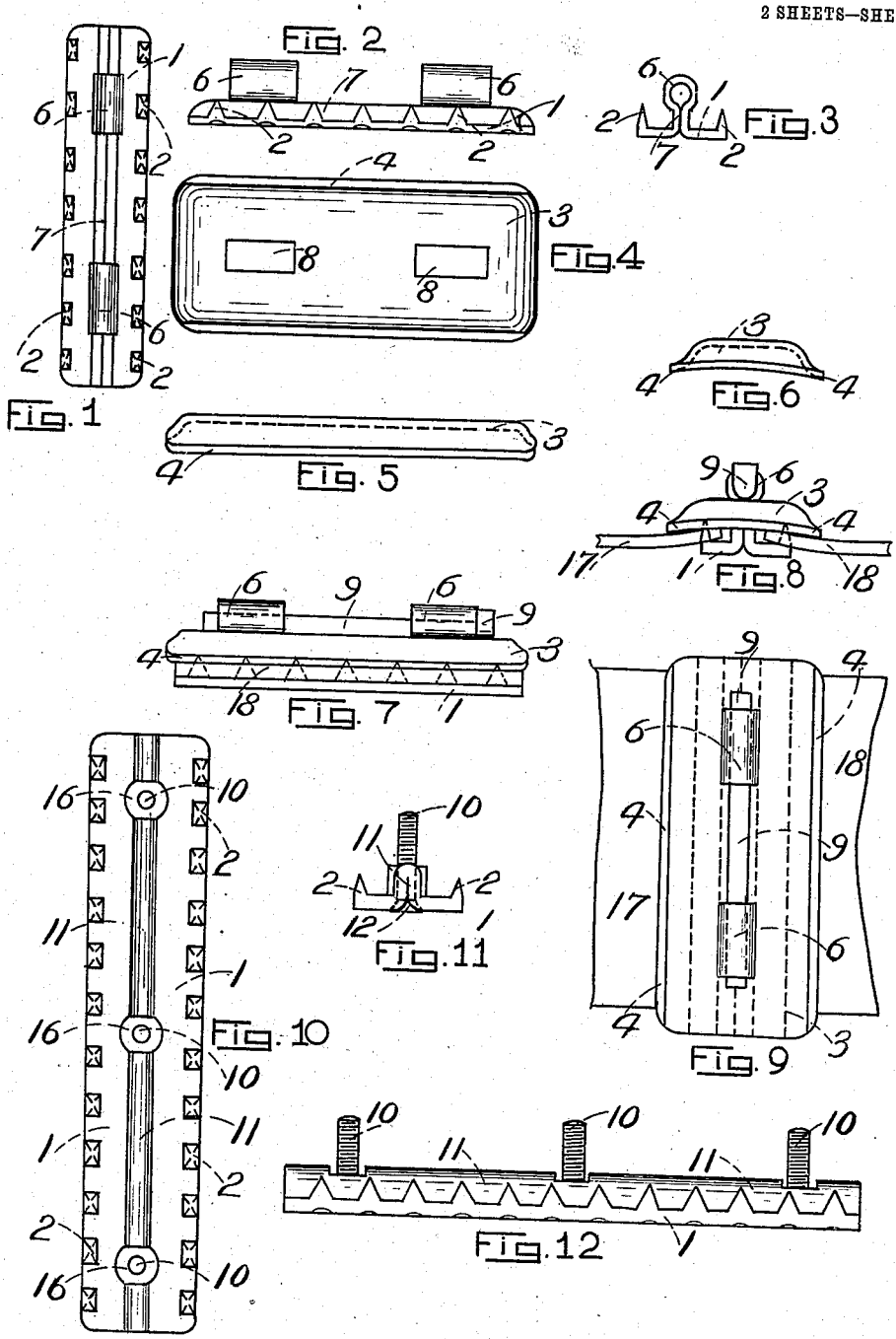

ARTHUR GRETTON TOMKIES, OF WESTPORT, NEW ZEALAND, ASSIGNOR OF ONE-HALF TO WILLIAM EDMOND REYNOLDS, OF GREYMOUTH, NEW ZEALAND.

BELT-FASTENER.

No. 900,615.　　　　Specification of Letters Patent.　　　Patented Oct. 6, 1908.

Application filed November 7, 1907. Serial No. 401,126.

*To all whom it may concern:*

Be it known that I, ARTHUR GRETTON TOMKIES, a subject of Great Britain, residing at Westport, New Zealand, have invented new and useful Improvements in Belt-Fasteners, of which the following is a specification.

This invention relates to belt fasteners, and it consists in an improved belt fastener which is adapted for use on all classes of belts, grips the full width of the belt without damaging the fabric thereby affording great strength, is safe in use, and can be readily applied both to old and new belting. This belt fastener grips the ends of the belt as in a vise without damaging them thus insuring a durable joint.

The belt fastener comprises a preferably oblong lower plate provided with vertical teeth on the two longer parallel edges, a slightly concave upper plate of similar shape to but wider than the lower plate, and means for securing the two plates together so that the ends of the belt are gripped between them as in a vise, the teeth of the lower plate entering the belt near the ends thereof respectively. Various means may be employed for securing the plates together two instances being hereinafter described and illustrated, adapted respectively for small and large belts.

The invention is illustrated in the accompanying drawings, in which the same numerals of reference indicate the same parts, and Figure 1 is a plan view of the lower plate for small belts. Fig. 2 is a side view of the same. Fig. 3 is an end view of the same. Fig. 4 is a plan view of the upper plate for small belts. Fig. 5 is a side view of the same. Fig. 6 is an end view of the same. Fig. 7 is a side view of the fastener for small belts in position on a belt. Fig. 8 is an end view of the same. Fig. 9 is a plan view of the same. Fig. 10 is a plan view of the lower plate for large belts. Fig. 11 is an end view of the same. Fig. 12 is a side view of the same. Fig. 13 is a plan view of the upper plate for large belts. Fig. 14 is a side view of the same. Fig. 15 is an end view of the same. Fig. 16 is a side view of the fastener for large belts in position on a belt. Fig. 17 is a plan view of the same. Fig. 18 is an end view of the same. Fig. 19 is a detail view of one of the nuts used for securing the plates of the fastener for large belts.

The lower plate (1) of the fastener is formed preferably by stamping out from sheet metal such as rolled steel. It is preferably oblong in shape and is provided with vertical teeth (2) formed on the two longer parallel edges. The upper plate (3) is also formed preferably by stamping out from sheet metal such as rolled steel. It is of similar shape to but wider than the lower plate (1), is slightly concave, has its corners rounded, and has a flange (4) formed on each of the longer parallel edges. Strengthening ribs (5) see Fig. 13 are formed in the upper plate for large belts.

The means for securing the upper and lower plates together are as follows. In the case of a fastener for small belts, (see Figs. 1 to 9 inclusive) two or more eyes (6) are formed integral with a central flange (7) on the lower plate (1) and these eyes (6) are adapted to enter openings (8) formed in the upper plate (3), a pin (9) being passed through the eyes (6) to secure the plates (1) (3) together. In the case of a fastener for large belts, (see Figs. 10 to 19 inclusive) threaded pins (10) are secured in the central flange (11) of the lower plate (1) the pins being screwed into the flange and their heads (12) being riveted underneath the flange. These pins are adapted to enter openings (13) in the upper plate (3) which are larger in diameter than the pins (10) in order that the extensions (14) of the special nuts (15) see Fig. 19 preferably used which are screwed up on the pins (10) to secure the plates together, may pass through the upper plate and be screwed down on seats (16) formed in the central flange (11) of the lower plate (1). The peculiar construction of these nuts (15), gives a greater hold and lessens the projection of the nut heads above the upper plate (3).

To increase the holding power of the belt fastener, especially for rubber belting, the upper plate (3) may be provided with a series of downwardly struck teeth (2) on the lower plate (1) and adapted to alternate with them.

The belt fastener is operated as follows. The lower plate (1) is driven into the under surface of the belt close to two adjacent edges (17) (18) thereof, and the upper plate (3) is placed on the upper surface of the belt over the lower plate (1) and secured tightly by the securing means, the flanges (4) of the upper plate lying on the belt a little beyond the teeth on the lower plate (1).

Having now described my invention, what I claim as new and desire to secure by Letters Patent is:—

1. A belt fastener, comprising a lower flat plate having its two parallel edges turned up at intervals to form vertical teeth, a substantially concaved upper plate wider than the said lower plate, said teeth being adapted to extend into the cavity, and means for securing the two plates together with the ends of the belt between them.

2. A belt fastener comprising a lower flat plate having a row of vertical teeth on each of two of its edges, a longitudinal central flange formed integral with said lower plate, threaded pins secured into and riveted below said flange, a concaved upper plate wider than said lower plate and provided with holes for said pins, and nuts secured on said pins above said upper plate so as to hold the plates together with the ends of the belt between them.

In testimony whereof I have signed my name to this specification in the presence of two subscribing witnesses.

ARTHUR GRETTON TOMKIES.

Witnesses:
ROBERT PERCY MACKAY,
GEORGE FOWLER ALLEN.